Oct. 9, 1956  H. SACHTLEBEN  2,765,702
OPHTHALMOLOGICAL INSTRUMENT
Original Filed Feb. 24, 1951  7 Sheets-Sheet 1
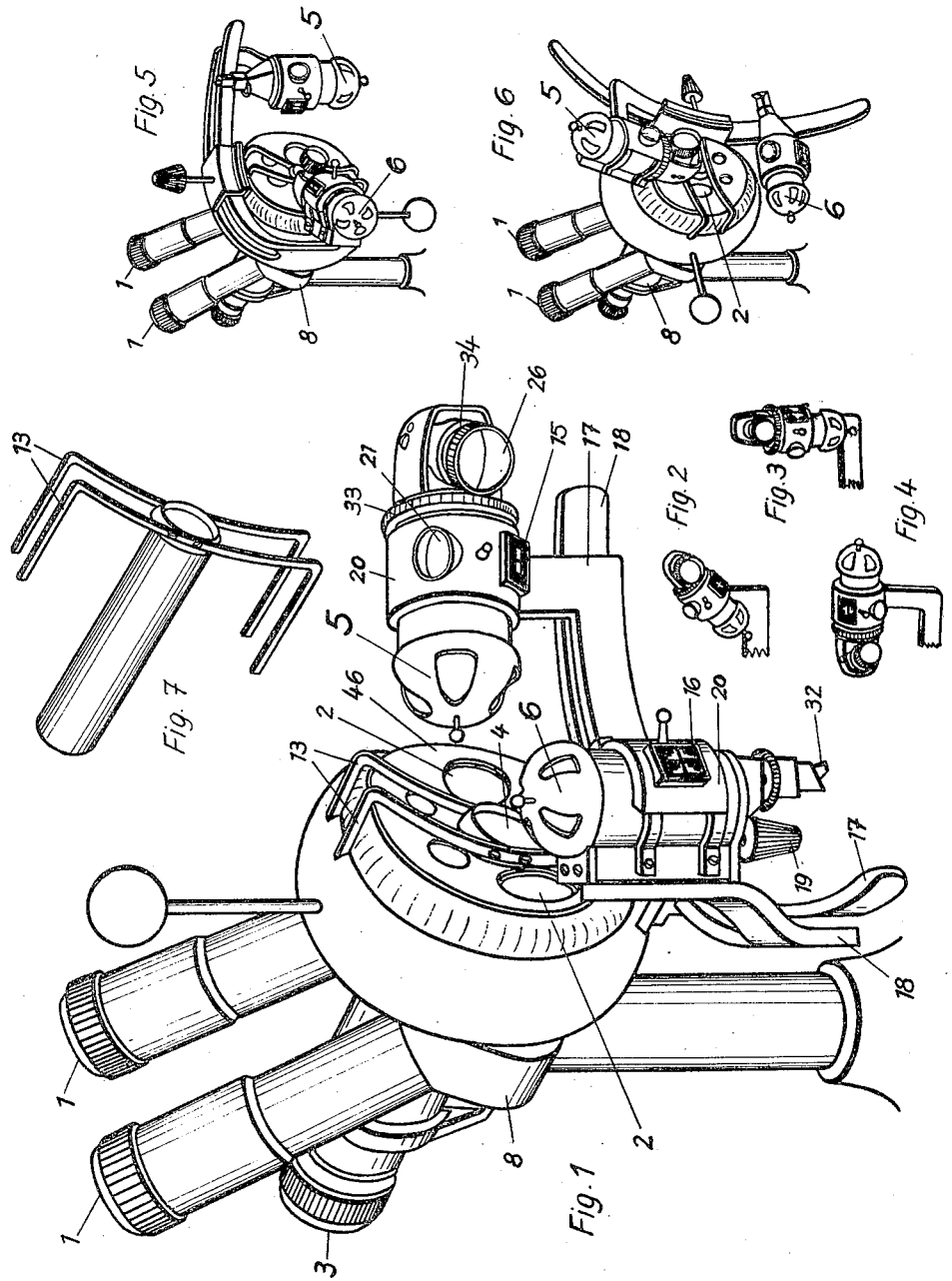
Inventor:
Heinrich Sachtleben
By E.J. Freeman
Attorney

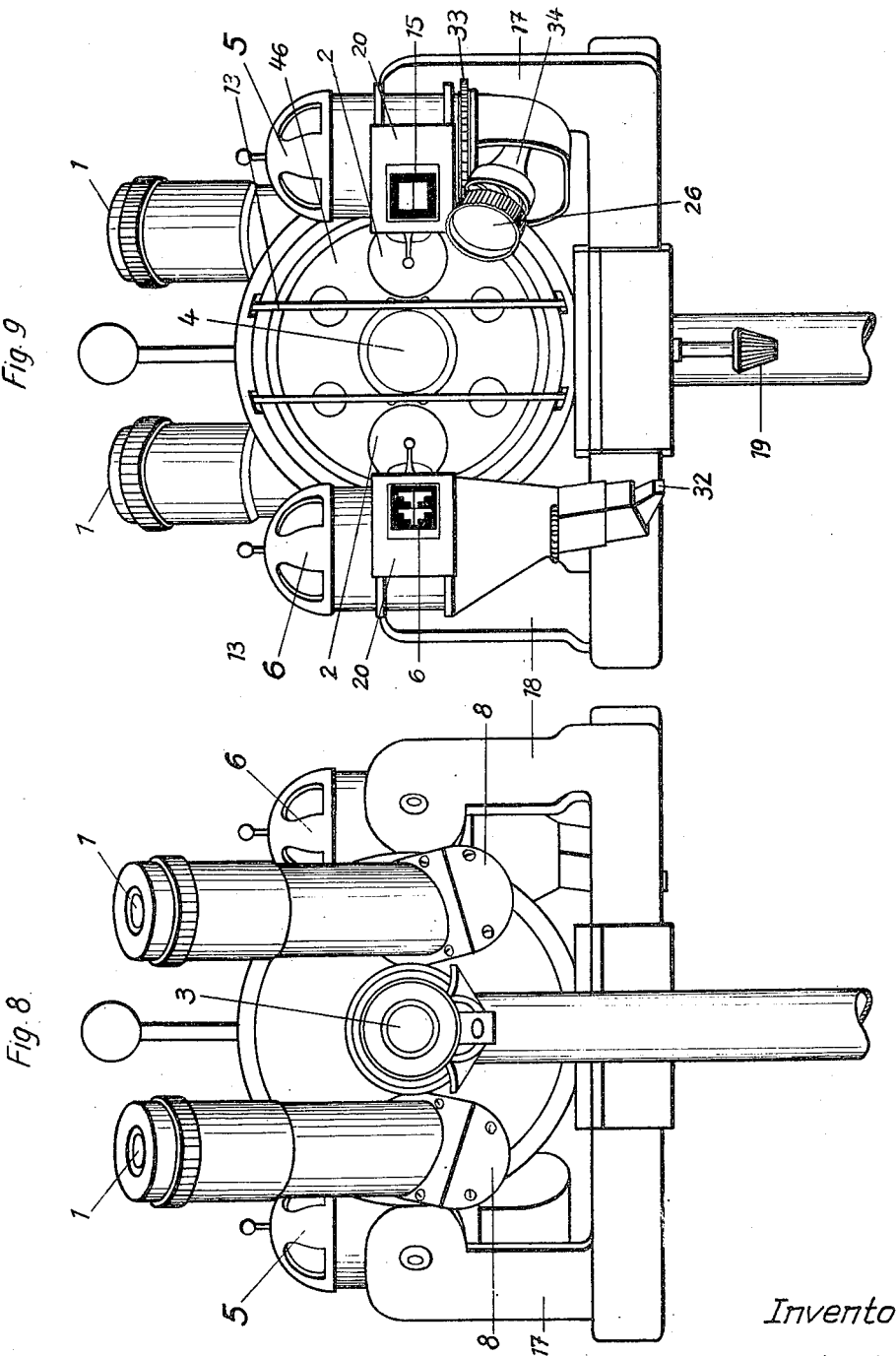

Oct. 9, 1956     H. SACHTLEBEN     2,765,702
OPHTHALMOLOGICAL INSTRUMENT
Original Filed Feb. 24, 1951     7 Sheets-Sheet 3
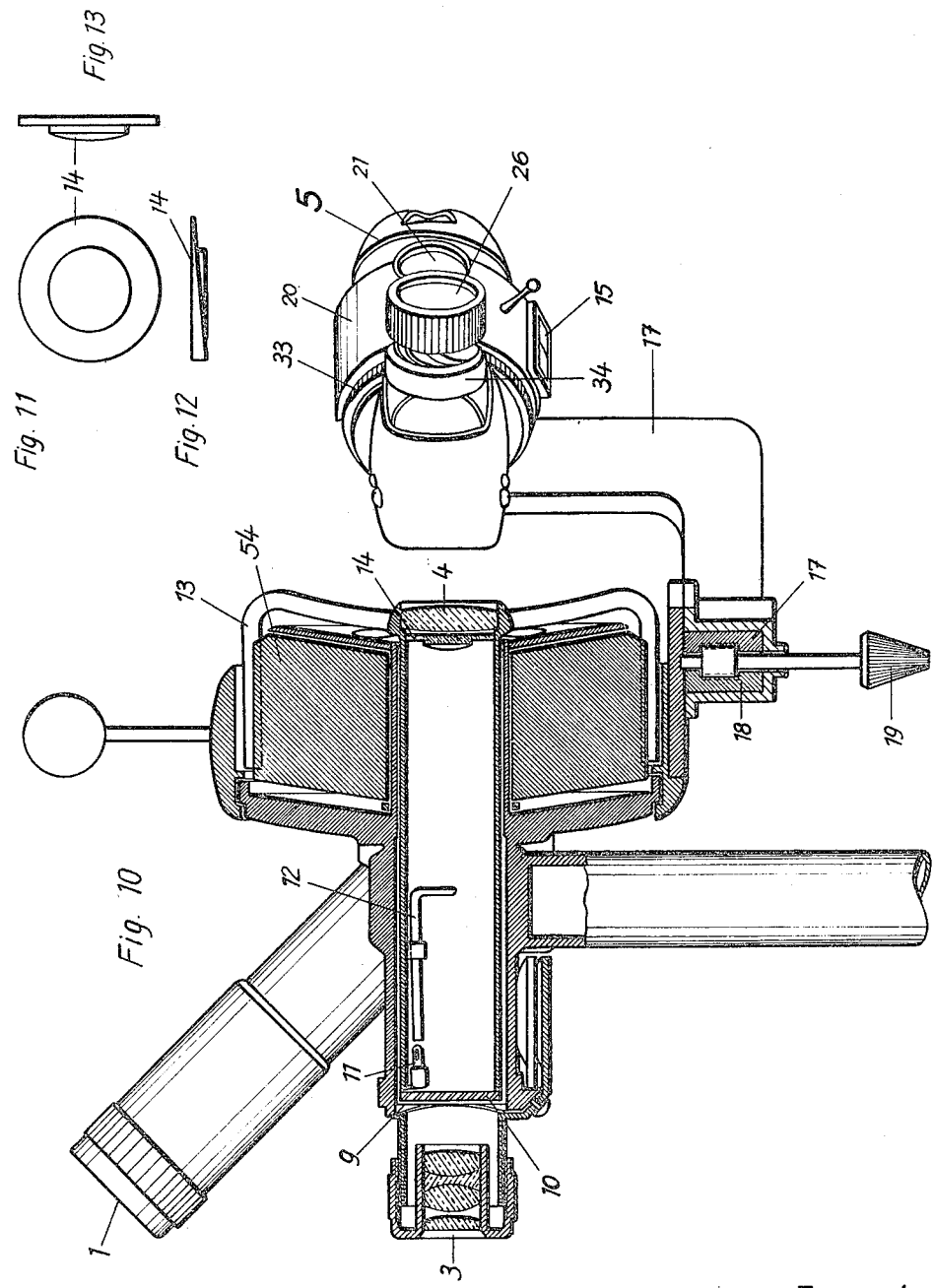
Inventor:
Heinrich Sachtleben
By G. J. Freeman
Attorney

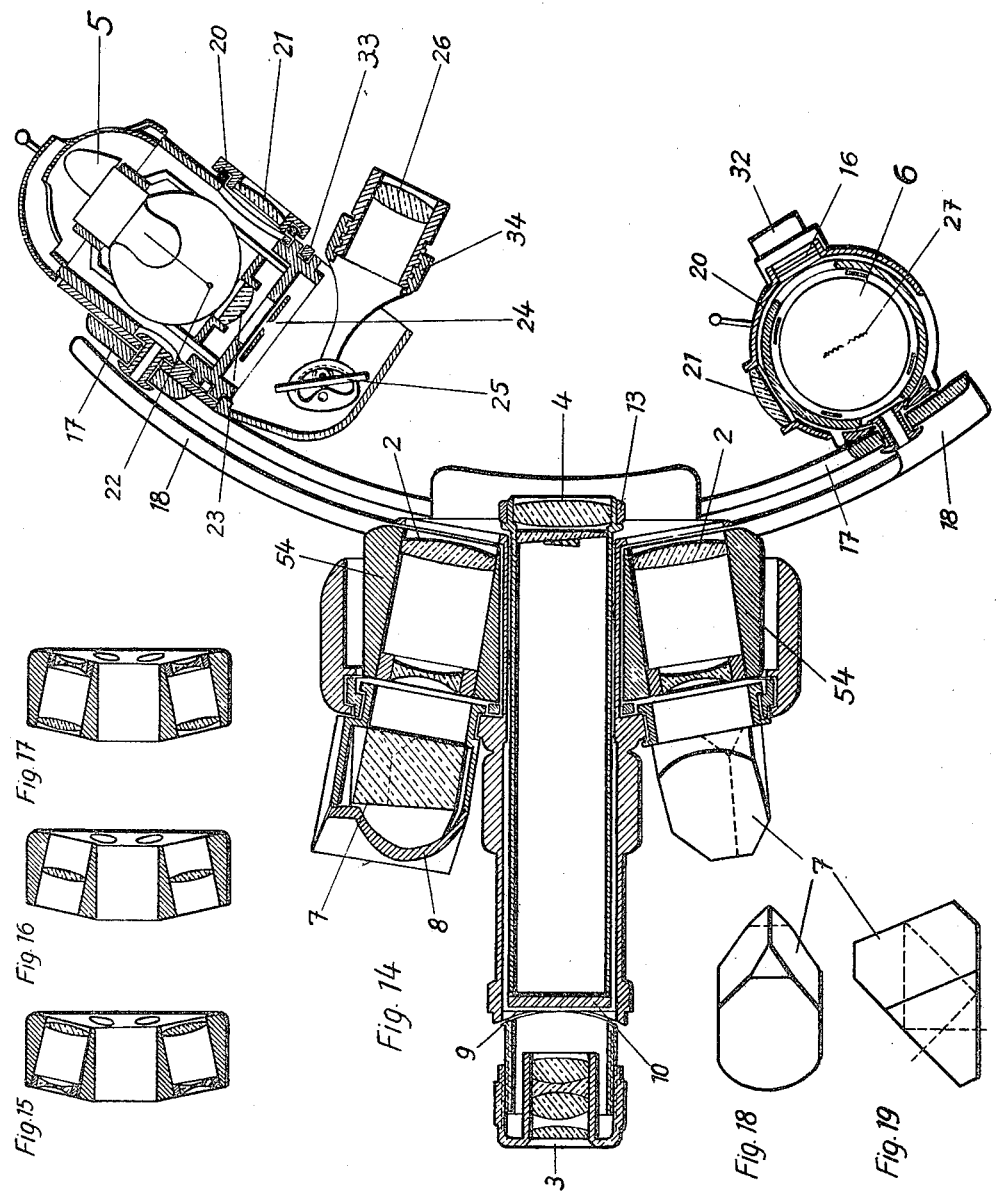

Oct. 9, 1956 H. SACHTLEBEN 2,765,702
OPHTHALMOLOGICAL INSTRUMENT
Original Filed Feb. 24, 1951 7 Sheets-Sheet 5
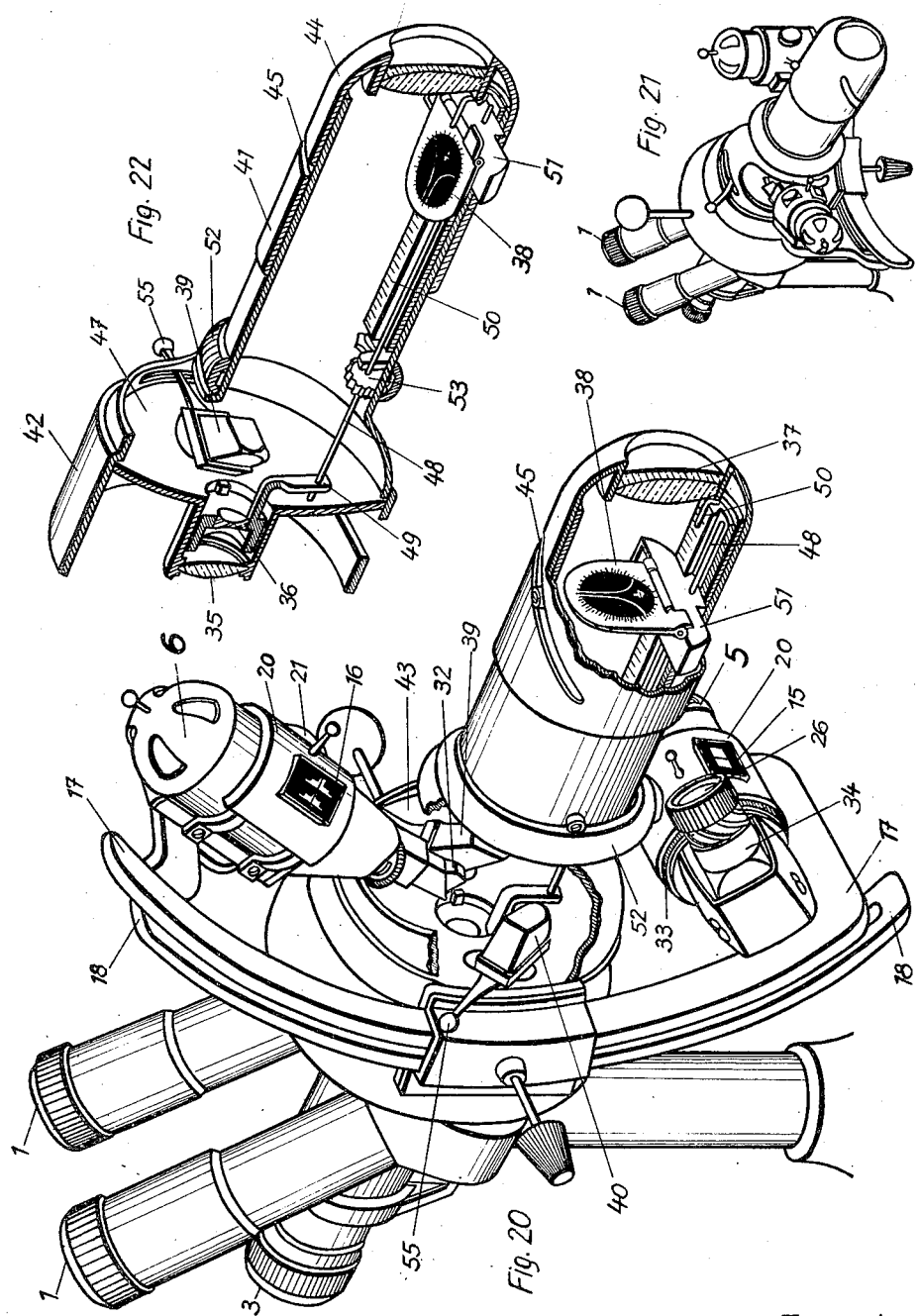
Inventor:
Heinrich Sachtleben
By E. J. Freeman
Attorney

United States Patent Office 2,765,702
Patented Oct. 9, 1956

2,765,702

OPHTHALMOLOGICAL INSTRUMENT

Heinrich Sachtleben, Siegen, Germany

Substituted for abandoned application Serial No. 212,597, February 24, 1951. This application March 11, 1955, Serial No. 493,593. In Germany October 1, 1948

Public Law 619, August 23, 1954
Patent expires October 1, 1968

12 Claims. (Cl. 88—20)

This invention relates to ophthalmological instruments and particularly to a multi-purpose instrument suitable for the examination of the human eye.

Various stationary instruments are known for ophthalmological examinations, such as the binocular corneal microscope including a lamp, the ophthalmometer, the binocular ophthalmoscope and the refractometer.

In view of the high cost of these instruments they are only found in clinics or in private laboratories while oculists usually must be satisfied with a corneal microscope and slit lamp and with an ophthalmometer, the necessary examinations being performed with cheap manually operated instruments.

The examination by means of the various known fixed instruments is made difficult and slowed down by the necessity to change the patient's position repeatedly in conformity with the adjustment of the instrument.

In accordance with the present invention a binocular corneal microscope having a slit lamp is combined with an ophthalmometer. Accordingly, the costs of the instruments are reduced as well as their space requirements.

It is accordingly an object of the invention to provide improved multi-purpose ophthalmological instruments which are less costly and which require less space than the conventional instruments.

It is another object of the invention to provide an improved combined corneal microscope and ophthalmometer which facilitates eye examinations and which require less time for its completion.

A further object of the invention is to provide an adaptor for an instrument of the above referred to type which will enable the instrument for use as a binocular ophthalmoscope or a refractometer and thereby provide a four-purpose ophthalmological instrument.

Various ophthalmological combination instruments are known.

Thus, an ophthalmometer in accordance with Suthcliffe includes a measuring microscope, which may be used for the microscopical examination of the eye when the image tripling device is removed. However, this instrument has no practical usefulness, because it lacks a slit lamp and does not permit binocular observation.

It has also been suggested by Henker to combine a binocular ophthalmoscope with a refractometer.

A similar combination is also used in connection with the instrument forming the subject matter of this invention, but with a greatly changed and improved construction and as an adaptor to the instant instrument, so that certain essential parts need not be utilized in the adaptor cooperating with the main instrument.

The combined ophthalmological instrument of the invention is essentially characterized by the combination of a binocular corneal microscope having a slit lamp with an ophthalmometer in such a manner that the opthalmometer measuring microscope is disposed in the vertical plane of the binocular corneal microscope and that their objectives are directed toward the same object point and have approximately equal focal distances or intercepts. The ophthalmometer may, for example, be of the Javal type; but it is to be understood that other constructions may also be used.

In accordance with a further important feature of the invention this two-purpose instrument is arranged in such a manner that at least a portion of the ophthalmometer measuring microscope may be exchanged with an adapter which permits the use of the instrument as a binocular ophthalmoscope and a refractometer. The adapter includes an ophthalmoscope lens, a measuring index or mark which may be swung into the path of the light rays, a pair of prisms disposed in front of the corneal microscope objective, which reduce the convergence of the light rays, and that portion of the ophthalmometer measuring microscope, which is not exchanged and which forms, with the adapter, a complete refractometer and measuring microscope.

The portion of the instrument which may be exchanged preferably includes the ophthalmometer objective, the image doubling device, the measuring plate, a small lamp and a base or reference point index.

Such an arrangement has important advantages with respect to the exact focal adjustment and reading of the instrument, as will be more fully explained hereinafter.

The adaptor, however, requires a special measuring microscope objective for the refractometer. This is not necessary if the part of the ophthalmometer measuring microscope to be exchanged is limited to the image doubling device. In that case, however, the above advantages of improved reading and focal adjustment cannot be attained. Furthermore, it is also feasible to arrange the ophthalmometer measuring microscope in such a manner, that it may be exchanged in its entirety with a suitable adaptor.

The illumination device may be constructed in dependence upon the use of an ophthalmometer in accordance with the principles of Helmholz (lamps having equal distance with a variable image doubling angle) or according to Javal (lamps having a variable distance with constant image doubling angle).

The best constructive solution is enabled by an ophthalmometer in accordance with Javal because the universal adjustability of the lamps (within a spherical calotte with respect to the object point) also yields an excellent suspension for the slit lamp if one of the two measuring-index or marking lamps is arranged as a slit lamp.

This is effected in accordance with the invention by adding to the same light source a second, indirect, bent light path. This problem may also be solved by exchanging one lamp with another or by adding a second light source.

In order to further increase the range of the light incidence angle, the slit lamp is made rotatable about an axis directed toward the object point. In order to vary the automatic coupling of the slit lamp and the corneal microscope to effect adjustment for examinations in regressive light, the slit lamp is made tiltable about small angles with respect to the support arms. The illumination means for the ophthalmoscopy and the measuring with the refractometer may either be part of the adaptor or may be provided by adding a second indirect light path to the other one of the two Javal measuring lamps. This type of suspension of the Javal lamps may be used for a corneal microscope provided with a slit lamp only as well as for any other combination of instruments for corneal microscopy and ophthalmometry. This application is a substitute for application Serial No. 212,597, filed February 24, 1951, now abandoned.

The invention will now be described in detail and with reference to the attached drawings, showing a preferred embodiment thereof.

In the drawings,

Fig. 1 is a perspective front view of an instrument embodying the invention and suitable for use as a corneal microscope with a slit lamp and ophthalmometer;

Figs. 2 to 4 are perspective views of the slit lamp alone in various positions with respect to its supporting arm;

Figs. 5 and 6 are perspective views of the slit lamp supporting arms in various positions with respect to the instrument;

Fig. 7 is a perspective view of the exchangeable front part of the ophthalmometer measuring microscope;

Figs. 8 and 9 are rear and front elevational views, respectively, of the instrument shown in Fig. 1;

Fig. 10 is a vertical sectional view of the instrument shown in Fig. 1;

Figs. 11 to 13 are front, plan and side elevational views of the image doubling device;

Fig. 14 is a horizontal sectional view of the instrument shown in Fig. 1;

Figs. 15 to 17 are sectional views of the revolving objective changer;

Figs. 18 and 19 are a side view and a plan view, respectively, of the Schmidt prism used with the instrument;

Fig. 20 is a perspective front view with parts broken away of the instrument for use as binocular ophthalmoscope and refractometer;

Fig. 21 is a perspective view of the instrument of Fig. 20 in a different position;

Fig. 22 is a perspective view and partial vertical section of the adaptor;

Figure 23:
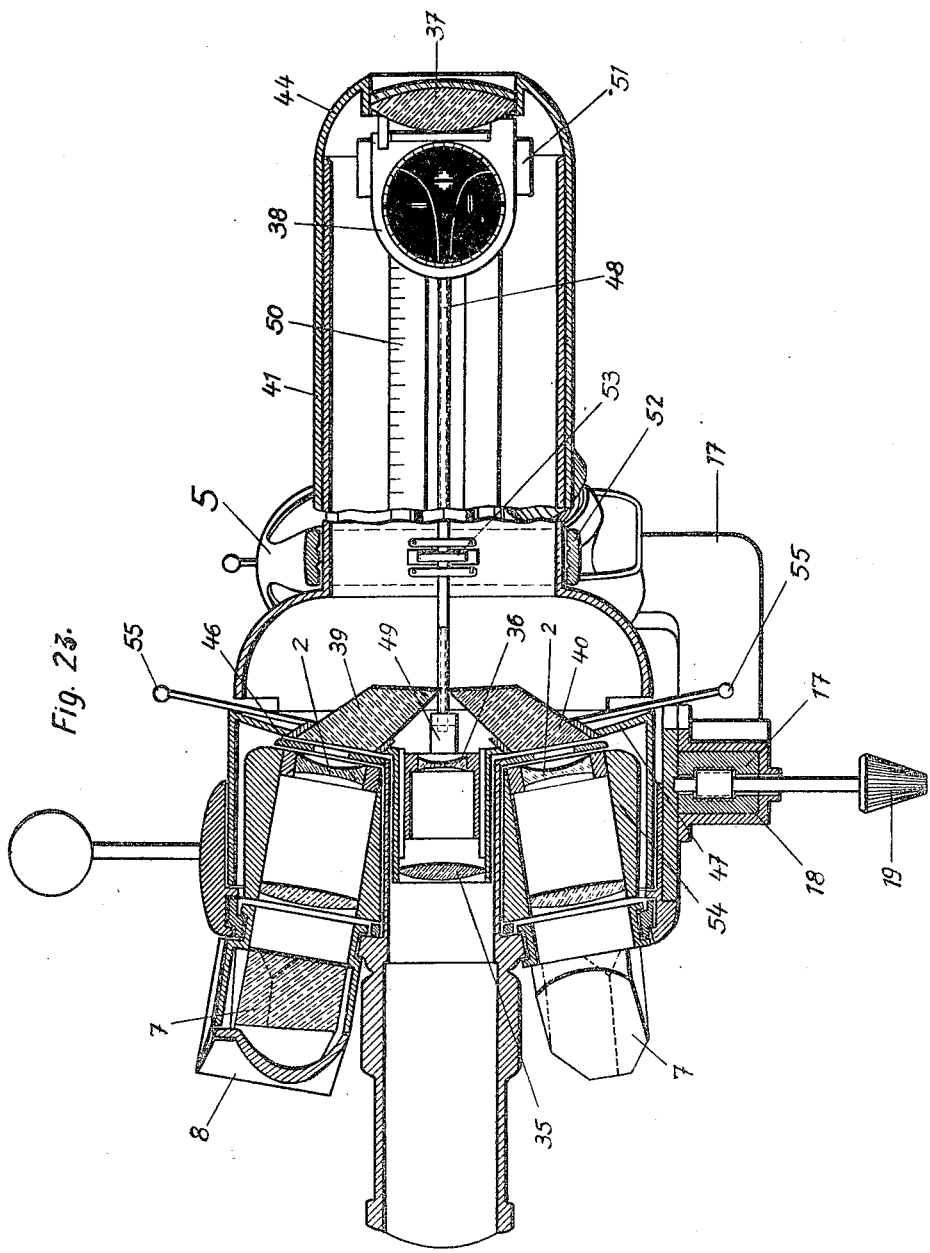
Fig. 23 is a horizontal sectional view.

Referring now to the drawings, in which like parts are designated by the same reference characters, the instrument of the invention includes the following main parts: a binocular corneal microscope with eyepieces 1 and objectives 2, a monocular ophthalmometer disposed in the vertical middle plane of the microscope having an eyepiece 3 and an objective 4. In accordance with the invention, the objective 4 and the objectives 2 of the corneal microscope are directed toward the same point, that is, the object point and they have the same focal or intersecting length and are preferably arranged in the same plane.

The instrument further comprises an illumination device consisting of the two lamps 5 and 6 and furthermore, an adaptor illustrated in Fig. 22 by means of which the instrument may be converted into a refractometer and a binocular ophthalmoscope. These main parts of the instrument will now be explained more in detail.

The corneal microscope is a binocular microscope which is adapted to its particular use, Firstly, by providing such an angle between the optical axes between objective and eyepiece that the observer can always keep the patient in view simply by changing his angle of viewing without being impeded by the position of the eyepiece;

Secondly, by increasing the angle of convergence of the objectives with respect to the normal convergence;

Thirdly, by reducing the angle of convergence of the eyepieces which enables the physician a fatigue-free observation.

This improves the stereoscopic effect of the image and renders the instrument particularly usable for the examination of the eye. Furthermore, without reducing the apertures, it is made possible, to provide a third objective for a measuring microscope and a three-part revolving objective disposed about the axis of the third objective.

The corneal microscope (see particularly Figs. 1, 8, 9, 10 and 14) includes the eyepiece 1, the objectives 2 as well as the prisms 7, which completely reverse the image and bend the light rays.

The prisms 7 are disposed in tiltable housings 8 in order to change the distance between the eyepiece; they are arranged at a distance from the intersecting points of their axes, which corresponds to the smallest adjustable distance of the pupils.

The pairs of objectives 2 consist of a magnifying, a normal and a reducing system of equal intersecting distance (focal length) for the object and the image so that it is only necessary to insert the two systems of equal construction in opposite directions into the revolving device 54 (see Figs. 15, 16 and 17). This construction may be used for any binocular microscope.

The ophthalmometer measuring microscope has an inner scale 10, 12. The eyepiece 3 or at least the eyelens thereof is stationary as well as a part of the angle measuring device or scale 9, while the other parts such as the ruled plate 10 having a graduated scale, an illumination device 11, reference point device 12 and suspension arms 13, objective 4 and image doubling device 14 are rotatably disposed (see Fig. 7).

However, it is also possible to dispose the eyepiece 3 in such a manner, that it may be downwardly tilted in order to reduce the length of the instrument. The image doubling device 14 consists of two glass members, which deflect the light in opposite directions and which are disposed in front of, in the rear of or between different zones or segments of the objective 4 or which are ground into the objective such as the annular arrangement shown in Figs. 11, 12, and 13.

The rotatable parts are all disposed in the exchangeable tubus shown in Fig. 7, which may be exchanged with the adaptor of Fig. 22, so that the fixed eyepiece 3 may also be used for the refractometer-measuring microscope. The inner scale mentioned before may be used for any ophthalmometer.

Figure 24:
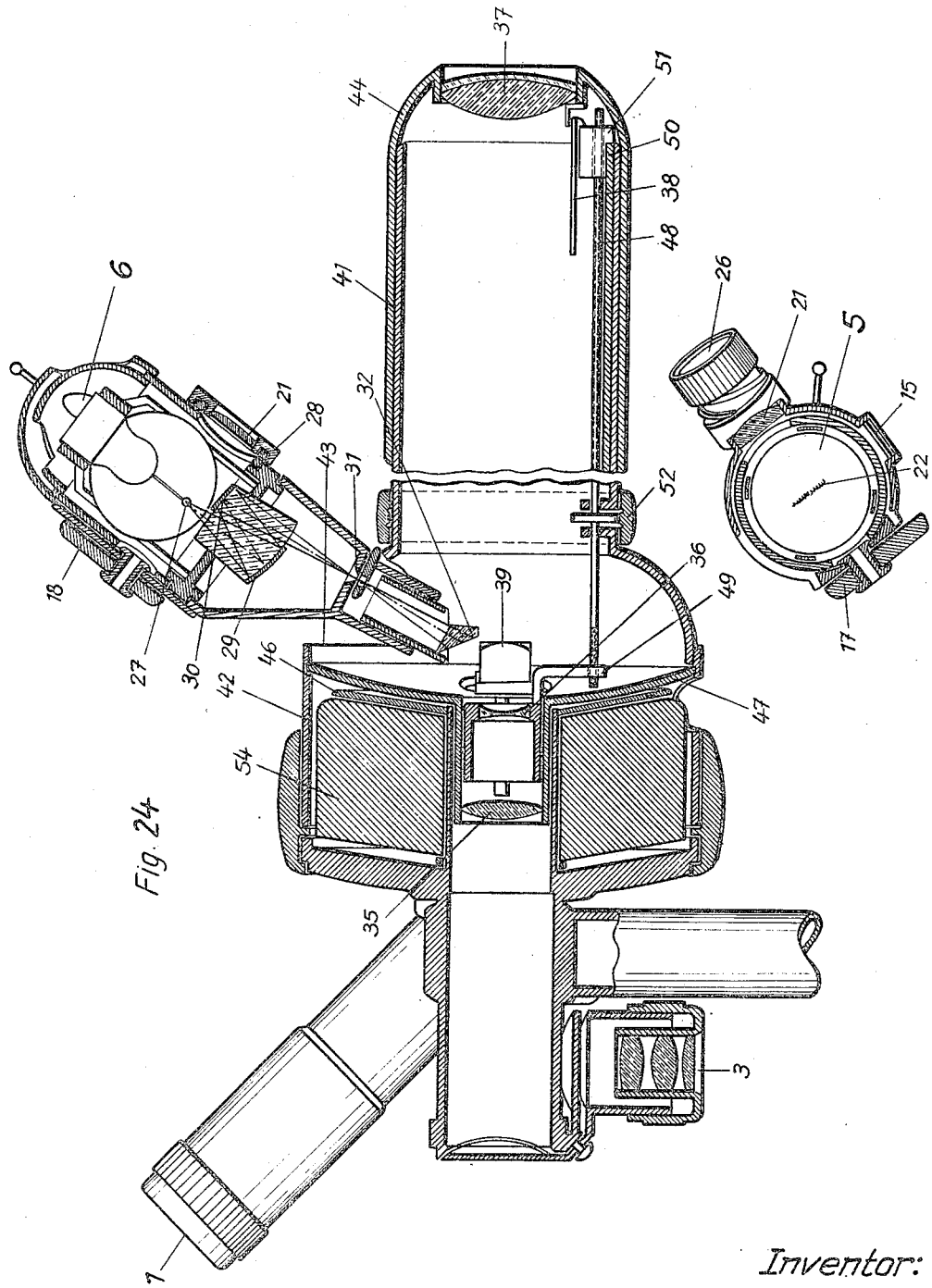
Fig. 24 is a vertical sectional view of the instrument shown in Fig. 20.

The illumination device consists of the usual two lamps 5 and 6 for the measuring indicia or marks 15 and 16 in accordance with the Javal ophthalmometer, which are secured to arc-shaped suspension arms 17 and 18 which move in opposite directions and which may be actuated toward or away from each other by rotating the drive knob 19 or which may be rotated about the axis of the instrument by tilting the same. The two measuring lamps 5 and 6 are not fixedly secured to the suspension arms 17, 18, but are rotatable about axes which pass through the object or observation point. Furthermore, the two measuring marks are located on rotatable sliders 20, which enable the interposition of lenses 21 into the light path, to develop a cone of scattered light or to cut off the light completely. Furthermore, each of the lamps 5 and 6 is provided with optical means to cause a second bent light path. One of the lamps has known means for developing a slit light ray including filament 22, condenser 23, adjustable slit 24, mirror 25, and illumination lens 26. The other lamp has modified optical means for purposes of illumination for the ophthalmometer and refractometer, that is, filament 27, prism 28, spherical mirror 29, plane mirror 30, adjustable slit 31 and reflecting prism 32 (see Fig. 24).

The instrument is used as a corneal microscope with a slit lamp, as follows:

At first, the instrument with its slit lamp 5 is brought into the position shown in Figs. 1, 10 and 14 and adjusted to produce a sharp image by moving it back and forth. Then, the slit is opened and adjusted to the desired width by rotation of ring 33. Finally, the projection lens 26 is directed toward the middle of the field of view by tilting its arm 34, whereby the mirror 25 follows and is tilted through half of the angle through which the arm 34 is rotated. At the same time, the slit 24 is focussed by rotating the lens. In view of the automatic coupling of the field of view and the slit lamp it is only necessary to move the instrument as a unit. For adjustment of observations in regressive light and the like, the slit lamp may be moved by itself by tilting the illumination lens 26 within the field of view.

The instrument of the invention makes it possible for the first time to carry out examinations in a slit light beam, which impinges from above or below, that is, outside of the horizontal plane and, furthermore, with any desired direction of the slit.

To this end the lamp 5 is tilted about its axis into a position as shown in Figs. 1, 10 and 14. Depending upon whether the light is desired from the left or from the right, the lamp 5 with the suspension arms 17, 18 is tilted through 180 degrees to one side or to the other (see Fig. 5).

By means of the diffuse light which is developed when the slit is closed by interposing the lenses 21 of both lamps 5 and 6 into the direct path of the light rays, it is possible to obtain a shadow-free illumination which is particularly suited for removing foreign bodies from the eye (see Fig. 6). If the direct path of the light rays is again shut off, while the lamps are in this position, and if instead the slit 24 is opened again and the arms 17 and 18 are rotated through 90 degrees, and if the projection lens is brought into a position directly above the optical axis of the instrument by letting the lamps 5, 6 approach each other, the deeper portions of the eye can be observed by the microscope because the light almost reaches into the center of the eye (see Fig. 6). If a lens is provided in a known manner, the fundus of the eye may also be observed in the light of the slit lamp by the microscope.

If the instrument is to be used as ophthalmometer, both lamps 5, 6 and measuring marks 15, 16 are disposed as shown in Figs. 8, 9. The instrument is now used like a conventional ophthalmometer in accordance with Javal, but the position of the axes is read in the interior of the optical system.

The adaptor in accordance with Fig. 22 is inserted into the instrument in place of the rotatable unit of the ophthalmometer-measuring microscope of Fig. 7 (see Figs. 20, 21, 23 and 24). The adaptor includes a measuring microscope objective which consists of two parts 35, 36, an ophthalmoscope objective 37, a measuring plate 38 which is hinged, so that it may be put into and out of the optical path, and a pair of prisms 39, 40 which may be brought out of the path of the rays of the measuring microscope objective (see Figs. 20, 22, 23 and 24). These are disposed in a tube-like housing 41 to protect them from external influences. The housing 41 is provided toward its front with a fairly wide sleeve 42 which extends into tube 41 through a conical intermediate piece having a lateral opening 43 through which the prism 32 of the lamp 6 may be introduced. A tube 44 supporting the built-in ophthalmoscope objective 37 extends over the tube 41 and is slidable by means of the spiral groove or slot 45. At the junction point between sleeve 42 and the intermediate piece there is provided a partition wall 47, which is outwardly curved and which follows the shape of the aperture plate 46. The partition wall 47 has a central opening in which there is secured a short sleeve which accommodates the objective members 35 and 36. The front member 36 is of concave shape and the rear member 35 of convex shape. Accordingly, the objective 35, 36 is a reducing system. The rear member 35 is fixed while the front member 36 is slidable in its sleeve. This makes it possible to change the focal length of the system or to focus the measuring microscope exactly onto the measuring mark 38 without changing the intersecting distance or focal distance with respect to the image. Thus, even if the distance of the object is variable the size of the image, that is, of the measuring mark 38 remains approximately equal which represents an important advantage.

In order to adjust the member 36 a special mechanism may be provided. However, it is even more advantageous to provide a common adjusting device for the member 36 and the displaceable measuring plate 38 of such a type that the constant position of the image is automatically assured.

Such an arrangement has been shown in the drawings.

The common adjusting device includes the stem 48 which engages with one end the angle arm 49 of the objective member 36 and with its other end engages the inner thread of the carriage 51 guided by rails 50 and supporting the measuring mark 38. In order to achieve the above purpose, the two ends of the stem 48 are provided with threads having different and opposite pitches. The stem 48 is actuated by a ring 52 having an internal gear which meshes with a pinion 53 secured to the stem 48.

In accordance with the invention, the pair of prisms 39, 40 are tiltably disposed in openings in the inner surface of the partition wall 47 and immediately adjacent the adjusted pair of objectives 2 of the revolving disk 54. The purpose of the prisms 39, 40 is to reduce substantially the convergence of the binocular microscope. Both prisms 39, 40 are tiltable about the axis of the associated objective 2 by means of a lever 55, so that their inner edges almost touch each other or that they move downwardly away from each other. By tilting the prisms 39, 40 it is possible to change the effective convergence angle whereby it is possible to choose the optimum stereoscopic image effect for any available width of the pupils. Furthermore, the prisms 39, 40 may be tilted out of the path of the measuring microscope objectives 35, 36 for refractometric measurements (see Fig. 20). The aperture of the objectives 2 is to be reduced by means of the aperture disk 46 as much as is necessary for the selected magnification in order to avoid cutting-off a portion of the light rays during their passage through the prisms 39, 40. The path of the light rays and the operation of the instrument of the invention when used as an ophthalmoscope and refractometer are substantially the same as that of the instrument in accordance with Professor Henker except for the illumination device.

In order to reduce its length, the light source is provided, between the filament 27 and the slit 31, not with an image forming lens, but with an image forming spherical mirror in combination with a plane mirror 30, which are provided as silvered surfaces of the glass prism 28 having correspondingly shaped surfaces. This is done not only to decrease the length of the lamp but also to provide equal object distance of the illumination pupil and for the observation pupil, because the illuminating light rays must not be deflected immediately in front of the slit 31 but at a certain distance therefrom.

The ophthalmoscope of the invention has the following advantages over the known Henker instrument:

1. A triple change of the magnification is provided for binocular observation, and 2. The optimum stereoscopic image can be adjusted.

If the instrument of the invention is used as refractometer, it has the following advantages over the previously known instrument:

1. Automatic sharp focusing of the image of the measuring mark, and

2. Equal size of the measuring mark image which permits an increased measuring accuracy for myopic eyes.

Since certain changes may be made in the above article and different embodiments of the invention could be made without departing from the scope thereof, it is intended that all matter contained in the above description or shown in the accompanying drawings shall be interpreted as illustrative and not in a limiting sense.

It is accordingly desired that in construing the breadth of the appended claims they shall not be limited to the specific exemplifications of the invention described herein.

Having thus described the invention, what I claim as new and desire to be secured by Letters Patent, is as follows:

1. In an ophthalmological instrument, in combination, a binocular corneal microscope having an axis and including two objectives, and an ophthalmometer measuring microscope according to Javal having one objective, the measuring microscope of said ophthalmometer being located in the main axis of said instrument, two lamp holders rotatably mounted about said main axis, measuring marks according to Javal adjustably mounted relatively to each other upon said lamp holders, electrical lamps fixed inside of said lamp holders to illuminate said measuring marks, said ophthalmometer measuring microscope being disposed in the vertical center plane of said corneal microscope, the objectives of said binocular cornear microscope being located on each side of said ophthalmometer measuring microscope at an angle to the said axis of the corneal microscope to direct the optical axes of said three objectives towards the same observation point, separate suspension arms for said lamp holders, being rotatable about said main axis, said lamp holders being adjustable upon said suspension arms, means for selectively interposing said measuring marks into the light beams directed towards said observation point, means rotatably mounted on at least one of said lamp holders for producing a slit-shaped light beam adapted to reach said observation point, and means to render said slit adjustable for the purpose to apply said instrument for slit-lamp bioscopy and for ophthalmometry.

2. In an ophthalmological instrument according to claim 1, an ocular having measuring marks being fixed inside of said ophthalmometer measuring microscope, a tubus being rotatably and exchangeably located in said ophthalmometer, an objective, an image doubling device, a graduated disk having an indexing device attached thereto being fixed inside of said tubus for the determination of the position of the axis of the astigmatism of the eye.

3. In an ophthalmological instrument according to claim 1, an adapter being rotatably and exchangeably located in said ophthalmometer, an ophthalmoscope objective, a slidable and tiltable measuring plate and a pair of prisms being located inside of said adapter and individually tiltably disposed in front of the objectives of said binocular corneal microscope to reduce the convergence of the light beans, a refractometer measuring microscope objective built into said adapter to replace the objective of said monocular ophthalmometer and to transform the instrument into a combined binocular ophthalmoscope and refractometer.

4. In an instrument as defined in claim 1, wherein the other one of said lamps is further provided with optical means for developing light suitable for refractometer measuring and ophthalmoscopy.

5. In an instrument as defined in claim 3, said prisms having a distance from each other corresponding to the smallest adjustable distance of the pupils and having axes adjacent the image which are substantially parallel and axes adjacent the object which include an angle which is larger than corresponds to the normal angle of convergence.

6. In an instrument as defined in claim 1, wherein each objective of said corneal microscope comprises a revolving objective carrier having a central axis and carrying three pairs of objectives of different magnification.

7. In an instrument as defined in claim 6, wherein one of said pairs of objectives is a normal system, the second one of said pairs of objectives is a magnifying system, and the third one of said pairs of objectives is a reducing system.

8. In an instrument as defined in claim 7, wherein said second and third one of said pairs of objectives have identical lenses and adapted to be used with reversed objects and images.

9. In an instrument as claimed in claim 1, wherein said ophthalmometer measuring microscope objective consists of two lens members, one of said lens members being fixed and disposed adjacent the image, the other one of said lens members being displaceable along its axis and disposed adjacent the object, said members being so arranged that the image remains constant when the object distance varies.

10. An instrument as defined in claim 9, wherein an adjusting device is provided for said displaceable lens member and said measuring plate, said adjusting device including a stem cooperating with means on said displaceable lens member and on said measuring plate for moving them simultaneously in opposite directions through different distances, whereby the image remains constant when the object distance varies.

11. An instrument as claimed in claim 3, wherein said pair of prisms is adapted to be tilted about the axes of the associated objectives of said corneal microscope.

12. An instrument as claimed in claim 3, wherein said adapter is enclosed in a tubular housing.

References Cited in the file of this patent

UNITED STATES PATENTS

| | | |
|---|---|---|
| 634,539 | Prentice | Oct. 10, 1899 |
| 864,769 | Brewer | Sept. 3, 1907 |
| 1,162,058 | Henker | Nov. 30, 1915 |
| 1,283,884 | Patterson et al. | Nov. 5, 1918 |
| 1,721,208 | Currier | July 16, 1929 |
| 1,862,031 | Patterson | June 7, 1932 |
| 1,958,280 | Patterson et al. | May 8, 1934 |
| 2,235,319 | Jobe | Mar. 18, 1941 |

FOREIGN PATENTS

| | | |
|---|---|---|
| 323,162 | Germany | July 16, 1920 |
| 598,550 | Germany | May 23, 1930 |
| 423,175 | Great Britain | Feb. 3, 1937 |
| 843,312 | Germany | Jan. 19, 1953 |